United States Patent
Grangeon et al.

[11] Patent Number: 5,853,582
[45] Date of Patent: Dec. 29, 1998

[54] TUBULAR INORGANIC FILTER ELEMENT HAVING INCREASED MECHANICAL STRENGTH AND INCREASED FILTER AREA

[75] Inventors: AndréGrangeon, Valreas; Philippe Lescoche, Favcow, both of France

[73] Assignee: T.A.M.I. Industries Societe Anonyme, Nyons, France

[21] Appl. No.: 760,751

[22] Filed: Dec. 5, 1996

[30] Foreign Application Priority Data

Dec. 5, 1995 [FR] France .................................. 95 14512

[51] Int. Cl.⁶ .................................................. B01D 63/06
[52] U.S. Cl. .............................. 210/321.89; 210/232.2; 210/500.23; 210/510.1; 96/5; 96/7; 96/10
[58] Field of Search ............................ 210/321.8, 321.78, 210/321.79, 321.88, 321.89, 321.87, 323.1, 323.2, 322, 500.23, 510.1; 96/4, 5, 7, 8, 10

[56] References Cited

U.S. PATENT DOCUMENTS

| | | | |
|---|---|---|---|
| 4,222,874 | 9/1980 | Connelly | 210/321.1 |
| 5,454,947 | 10/1995 | Olapinski et al. | 210/510.1 |
| 5,607,586 | 3/1997 | Grangeon et al. | 210/321.78 |
| 5,641,332 | 6/1997 | Faber et al. | 55/523 |

FOREIGN PATENT DOCUMENTS

| | | |
|---|---|---|
| 0 686 424 A1 | 12/1995 | European Pat. Off. . |
| 2 720 954 | 12/1995 | France . |
| WO 93/07959 | 4/1993 | WIPO . |

*Primary Examiner*—W. L. Walker
*Attorney, Agent, or Firm*—Bacon & Thomas

[57] ABSTRACT

An inorganic filter element for filtering a fluid medium in order to recover a filtrate, the filter element being of the type including an inorganic rigid porous support of cylindrical shape having a longitudinal central axis, and channels formed in the support parallel to its central axis and presenting respective surfaces each covered in at least one separator layer that is intended to come into contact with the fluid medium, and at least some "peripheral" ones of the channels. The channels have their centers situated on a circle that is coaxial about the central axis and present a peripheral wall situated facing the outside surface of the support and co-operating therewith to define a direct through passage for the filtrate, and at least one radial wall co-operating with the facing radial wall of an adjacent channel to define a partition, the walls being interconnected by connection fillets. The channels also have a transverse cross-section that is non-circular. Each of the peripheral channels has a through passage of thickness that increases on either side of the middle of the passage going away from the middle so that each through passage possesses a profile in the form of a vault for the purpose of increasing its mechanical strength.

9 Claims, 1 Drawing Sheet

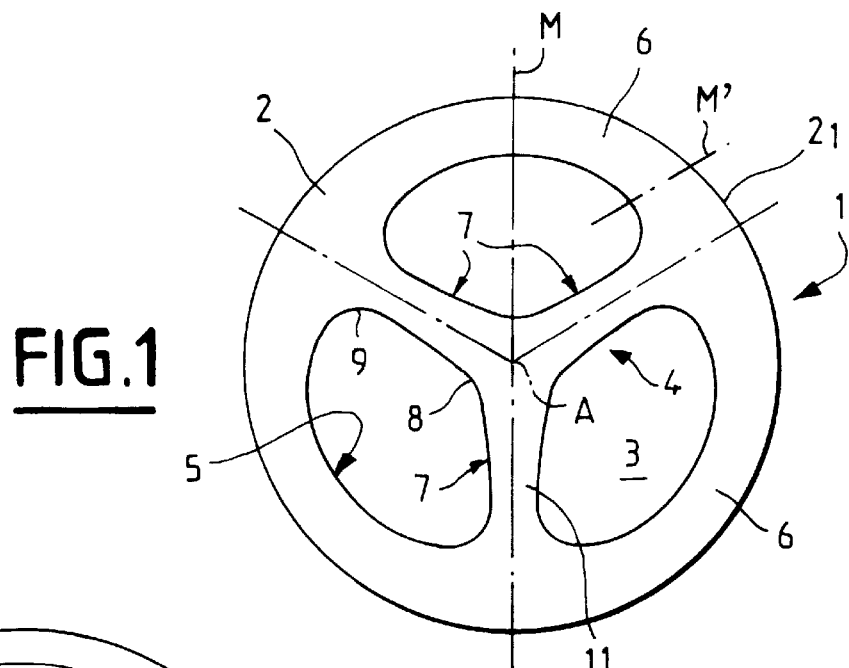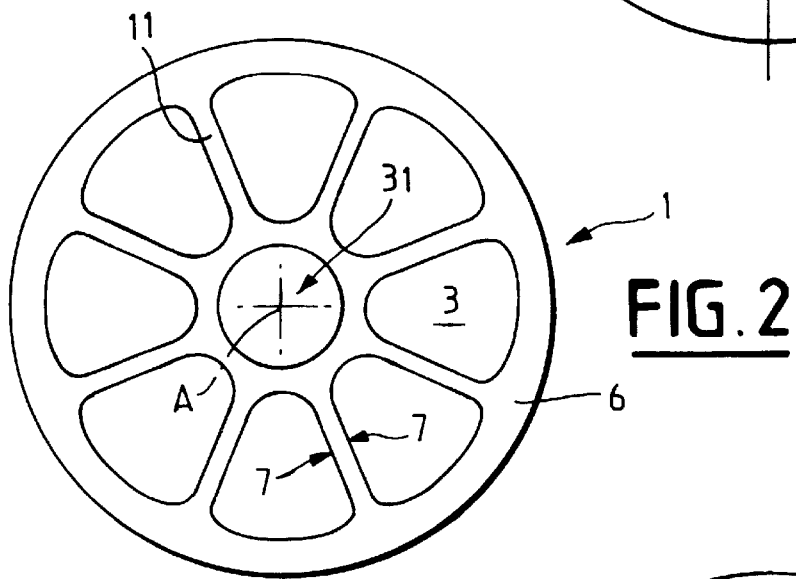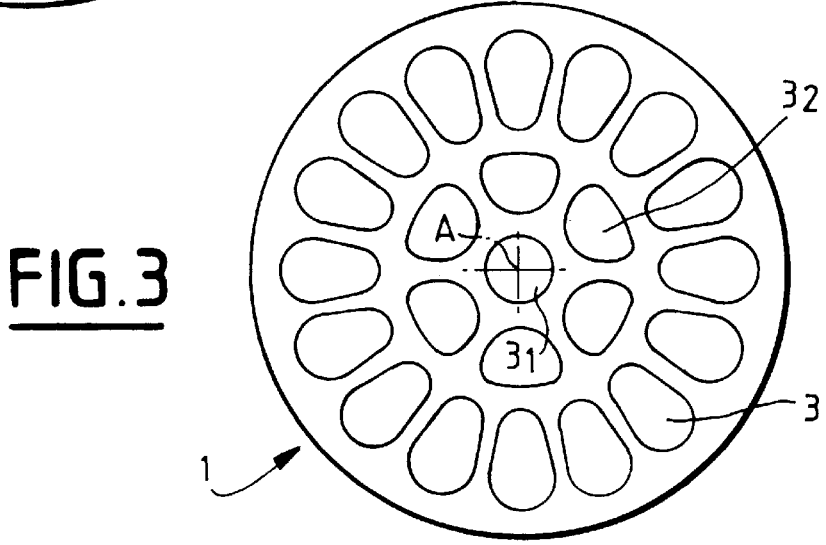

5,853,582

TUBULAR INORGANIC FILTER ELEMENT HAVING INCREASED MECHANICAL STRENGTH AND INCREASED FILTER AREA

FIELD OF THE INVENTION

The present invention relates to the technical field of molecular or particular separation implementing separator elements generally referred to as "membranes" and made of inorganic materials.

More precisely, the invention seeks to make an inorganic filter element of generally tubular shape that makes it possible to concentrate, sort, or extract molecular or particular species contained in a fluid medium exerting a given pressure on the membrane.

A particularly advantageous application of the invention lies in the fields of nanofiltration, ultra-filtration, microfiltration, filtration, and reverse osmosis.

BACKGROUND OF THE INVENTION

In the state of the art, numerous membranes are known that are made from tubular filter elements. Thus, a multichannel type filter element is known comprising a rigid porous support of elongate shape having a right section that is polygonal or circular. The porous support which may be made of ceramic, for example, is organized to include a series of channels that are parallel to one another and to the longitudinal axis of the porous support, each having a right cross-section that is circular. The surface of each channel is covered in at least one separator layer of nature and morphology adapted to separate the molecules or particles contained in the liquid medium circulating inside the channels. Such a membrane acts like a sieve to separate the molecular or particular species of the substance to be treated insofar as all molecules or particles greater than the pore diameter of the membrane are stopped. During separation, fluid transfer takes place through the separator layer(s), and then the fluid spreads between the pores of the support and travels to the outside surface thereof.

A major drawback of such multichannel filter elements lies in the low filtrate flow rate obtained. The path that has to be followed by the filtrate prior to reaching the outside surface of the support, particularly for channels situated in the central portion of the support, is much longer than that of the other channels, in particular those at the periphery. In addition, filtrate coming from the channels in the central region of the support picks up filtrate coming from other channels. That is why a headloss appears in the transfer of filtrate towards the outside surface of the support. This headloss opposes the transfer pressure and reduces the through speed.

To remedy that drawback, patent application WO 93/07959 proposes a tubular filter element each of whose channels has a right cross-section that is not circular. In a first embodiment, the filter element comprises an inorganic porous support in which the channels are formed parallel to the central axis of the support, being disposed substantially on a circle coaxial about the central axis. Each channel has, in right cross-section, a peripheral wall facing towards the outside surface of the support and co-operating therewith to define a passage of constant thickness through filtrate is conveyed. Each peripheral wall is extended at each of its circumferential ends by mutually interconnected radial walls co-operating with the facing radial walls of the adjacent channels to define respective partitions. The profile of the channels is selected so as to leave wedge-shaped partitions that flare going towards the outside of the substrate. In a second embodiment, the axes of the channels are situated either on a plurality of circles that are coaxial about the axis of the support or in layers that are parallel to one another and to the axis of the porous support. In the second embodiment, two adjacent layers of channels leave between them a partition that likewise flares going towards the outside of the substrate. It thus appears that the wedge-shape for the partitions defined between the radial walls favors transfer of permeate towards the outside surface of the support.

It also appears that by having channels of non-circular section, such an element makes it possible to increase the ratio of filter area over the volume required for the porous support. It must nevertheless be observed that such an element suffers from a major drawback in that it is more fragile than known prior elements. In a filter element having channels of circular section, the forces exerted by the fluid on the walls of the channels are uniformly distributed because of the circular section of the channels. However, the special profile of the channels in the filter element described in that patent application leads to localized forces being applied on certain portions which then constitute weak zones of the filter element.

OBJECTS AND SUMMARY OF THE INVENTION

The invention thus seeks to remedy the drawbacks mentioned above by proposing an inorganic multichannel filter element for fluid that is designed to optimize the ratio of filter area over the volume of the porous support used while nevertheless conserving good mechanical strength for the filter element.

To achieve this object, the inorganic element of the invention comprises:

an inorganic filter element for filtering a fluid medium in order to recover a filtrate, the filter element being of the type comprising:
an inorganic rigid porous support of cylindrical shape having a longitudinal central axis; and
channels formed in the support parallel to its central axis and presenting respective surfaces each covered in at least one separator layer that is intended to come into contact with the fluid medium, and at least some "peripheral" ones of the channels that:
have their centers situated on a circle that is coaxial about the central axis;
present both a peripheral wall situated facing the outside surface of the support and co-operating therewith to define a direct through passage for the filtrate, and at least one radial wall co-operating with the facing radial wall of an adjacent channel to define a partition, the walls being interconnected by connection fillets; and
all possess a right cross-section that is non-circular.

According to the invention, each of the peripheral channels has a through passage of thickness that increases on either side of the middle of the passage going away from the middle so that each through passage possesses a profile in the form of a vault for the purpose of increasing its mechanical strength.

Another drawback relating to the filter element described by document WO 93/07959 relates to making connection fillets between the radial walls and the peripheral walls such that the fillets present small angles. Under such conditions, it has been observed that, in the connection zones, layers are deposited of a thickness that is different from that of the layers deposited over other portions of the walls.

To remedy that drawback, the channels are defined by peripheral and radial walls and by connection fillets, each comprising circular segments.

According to an advantageous characteristic of the invention, the channels define between them partitions of thickness that increases towards the central axis of the porous support.

BRIEF DESCRIPTION OF THE DRAWING

Various other characteristics appear from the following description given with reference to the accompanying drawing, which shows embodiments and implementations of the invention as non-limiting examples.

FIG. 1 is a cross-section view of a variant embodiment of the filter element of the invention.

FIGS. 2 and 3 are section views showing two other variant embodiments of the invention.

MORE DETAILED DESCRIPTION

As can be seen in FIG. 1, the inorganic filter element 1 of the invention is adapted to separate or filter molecules or particles contained in a fluid medium, preferably a liquid, of various kinds and optionally including a solid phase. The filter element 1 comprises an inorganic rigid porous support 2 made out of a material whose resistance to transfer is adapted to the separation that is to be performed. The support 2 is made from inorganic materials such as metal oxides, carbon, or metals. The support 2 is generally elongate in shape or in the form of a duct extending along a longitudinal central axis A. The porous support 2 has pores of equivalent mean diameter lying in the range 2 $\mu$m to 12 $\mu$m, and preferably equal to about 5 $\mu$m. The right cross-section of the support 2 is hexagonal, or as shown in the example of FIG. 1, it is circular. The support 2 thus provides a cylindrical outside surface $2_1$.

The support 2 is arranged to include at least two, and in the example shown in FIG. 1, three channels 3 extending parallel to the axis A of the support. In the example shown, the three channels 3 are centered on a circle that is coaxial about the central axis A of the support and they are said to be peripheral channels. In this example, the porous support 2 has a diameter lying in the range 9 mm to 14 mm and preferably equal to about 10 mm. Each of the channels has a surface 4 that is covered in at least one separator layer (not shown) designed to be in contact with the fluid medium to be treated that circulates inside the channels 3. The nature(s) of the separator layer(s) is/are selected as a function of the separating or filtering power that is to be obtained and it bonds intimately with the support so that the pressure from the liquid medium is transmitted to the porous support 2. This or these layers may be deposited, for example, from suspensions containing at least one metal oxide and conventionally used for producing inorganic filter elements. After drying, this or these layers is/are subjected to a sintering operation for consolidating them and bonding them together and also to the porous support 2.

Each peripheral channel 3 has a right cross-section that is non-circular and that is preferably the same for all of the channels. Each channel 3 has a peripheral wall 5 extending directly facing the outside surface $2_1$ of the support so as to form a passage 6 for passing the filtrate directly. Each channel 3 also includes at least one, and in the example shown, two radial walls 7 that are connected together by a connection fillet 8 and that are also connected to the peripheral wall 5 via connection fillets 9. Each radial wall 7 of a channel 3 co-operates with a facing radial wall 7 of an adjacent channel to define a partition 11.

According to the invention, the through passages 6 are of a thickness that increases on either side of a midpoint M of the passage going away from the midpoint so that each through passage 6 has a profile in the form of a vault or arch increasing the mechanical strength of the passage 6. In the example shown, each through passage 6 is of thickness that increases substantially from the middle M of the passage and on both sides of said middle. The middle can be considered as the plane of symmetry of the channel that also includes the axis A of the porous support. Naturally, it is not impossible for the thickness of the passage 6 in this region M to be substantially constant and for it subsequently to increase progressively going away in two opposite directions from the middle M. The thickness of the passage 6 increases between the midplane M and the outer plane M' by a factor of about 1.4, for example.

The thickness of each through passage 6 preferably increases continuously or steadily substantially from the middle of the passage and on either side of said middle. The passages 6 thus convey filtrate towards the outside surface $2_1$ of the porous support. By forming the through passages so that they are vaulted or arcuate in shape it is possible to give them appropriate mechanical strength for withstanding the pressure of the fluid circulating inside the channels of non-circular section.

According to an advantageous characteristic of the invention, the peripheral walls 5 and the radial walls 7 of the channels present respective circular profiles in right cross-section, as can be seen clearly in FIG. 1. Also preferably, the connection fillets 8, 9 are also circular in profile. Thus, each channel 3 comprises, in right cross-section, a succession of circular arcs making it possible to obtain surfaces that are adapted to improving deposition of separator layers. According to an advantageous characteristic, the profile of the radial walls 7 is adapted so that each partition 11 is of a thickness that increases going towards the central axis A. By making partitions 11 of a thickness that increases from the outside towards the inside of the support 2, it is possible to increase the angle of the connection between the radial walls 7 of a single channel, thereby reducing the presence of the connection fillet 9 that would otherwise spoil the quality with which the separator layers are deposited.

In the example shown in FIG. 1, all of the channels 3 are "peripheral" insofar as they all lie on a circle that is coaxial about the axis A. Insofar as all of the channels 3 of the element of the invention have respective direct through channels to the outside surface $2_1$, headloss during filtrate transfer is considerably reduced compared with prior technical solutions.

FIG. 2 shows another embodiment of an inorganic element 1 having a diameter of about 25 mm, for example. In this example, the porous support 2 is organized to comprise a "peripheral" series of channels 3 (there being eight of them in the example shown), and their centers are situated on a common circle that is coaxial about the longitudinal axis A of the porous support 2. Each channel 3 is organized in such a manner as to leave an arcuate through passage 6 as shown in greater detail in FIG. 1. In order to optimize the ratio of filter area over porous support volume used, the filter element 1 includes an additional channel $3_1$ centered on the longitudinal axis A. By making a central channel $3_1$, it is possible to optimize the filter area while conserving appropriate mechanical strength for the inorganic element. The central channel $3_1$ preferably possesses a right cross-section that is circular. In the example shown, it should be observed that the radial walls 7 define between them passages 11 of substantially constant thickness.

FIG. 3 shows a variant embodiment in which the filter element 1 has a series of peripheral channels 3 lying on a circle that is coaxial about the axis A, and a second series of "internal" channels $3_2$ likewise placed on a circle that is coaxial about the axis A. In the example shown, there are sixteen peripheral channels 3 while there are six internal channels $3_2$. It should be observed that the right cross-section of the channels within either series is identical but is different from one series to the other. In this example, the filter element also includes a central channel $3_1$ which is preferably circular in right cross-section.

The invention is not limited to the examples described and shown, since various modifications can be applied thereto without going beyond the ambit of the invention.

We claim:

1. An inorganic filter element for filtering a fluid medium in order to recover a filtrate, the filter element comprising:

an inorganic rigid porous support of cylindrical shape having a longitudinal central axis and an outside surface; and channels formed in the support parallel to its central axis and presenting respective surfaces each covered in at least one separator layer that is intended to come into contact with a fluid medium, the channels having a right cross-section that is non-circular and at least some peripheral channels having their centers situated on a circle that is coaxial about the central axis, the at least some peripheral channels presenting both a peripheral wall situated facing the outside surface of the support and cooperating therewith to define a direct through passage for the filtrate, and at least one radial wall cooperating with a facing radial wall of an adjacent channel to define a partition, the walls being interconnected by connection fillets; and wherein the through passage of each of the peripheral channels increases in thickness on either side a midplane bisecting the respective passage so that each of the through passages possesses a profile in the form of a vault for the purpose of increasing its mechanical strength.

2. An inorganic filter element according to claim 1, wherein each through passage increases in thickness from substantially the midplane of the passage away from each side of the midplane.

3. An inorganic filter element according to claim 2, wherein each through passage increases in thickness continuously.

4. An inorganic filter element according to claim 1, wherein the channels are defined by peripheral and radial walls and by connection fillets having circularly arcuate profiles.

5. An inorganic filter element according to claim 1, further comprising: partitions defined between the channels, the partitions increasing in thickness towards the central axis of the porous support.

6. An inorganic filter element according to claim 1, wherein all of the channels are peripheral channels with their centers being situated on a single circle that is coaxial about the central axis of the support.

7. An inorganic filter element according to claim 1, wherein some of the channels comprise at least one row of internal channels with their centers being situated on a second circle that is coaxial about the central axis of the support.

8. An inorganic filter element according to claim 1, including a central channel centered on the axis of the support.

9. An inorganic filter element according to claim 8, wherein the central channel has a right cross-section that is circular.

* * * * *